US012101596B2

(12) United States Patent
Yang et al.

(10) Patent No.: US 12,101,596 B2
(45) Date of Patent: Sep. 24, 2024

(54) SPEAKER MODULE AND PORTABLE ELECTRONIC DEVICE

(71) Applicant: HUAWEI TECHNOLOGIES CO., LTD., Guangdong (CN)

(72) Inventors: Wentao Yang, Wuhan (CN); Qiong Ruan, Wuhan (CN); Shitao Chen, Wuhan (CN); Yanbiao Luo, Wuhan (CN); Jie Liu, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 160 days.

(21) Appl. No.: 17/778,556

(22) PCT Filed: Nov. 11, 2020

(86) PCT No.: PCT/CN2020/128013
§ 371 (c)(1),
(2) Date: May 20, 2022

(87) PCT Pub. No.: WO2021/098563
PCT Pub. Date: May 27, 2021

(65) Prior Publication Data
US 2022/0417648 A1 Dec. 29, 2022

(30) Foreign Application Priority Data
Nov. 22, 2019 (CN) ......................... 201911159240.5

(51) Int. Cl.
*H04R 1/22* (2006.01)
*H04R 1/02* (2006.01)
(Continued)

(52) U.S. Cl.
CPC ............. *H04R 1/227* (2013.01); *H04R 1/025* (2013.01); *H04R 1/028* (2013.01); *H04R 3/00* (2013.01);
(Continued)

(58) Field of Classification Search
CPC ........ H04R 1/227; H04R 1/025; H04R 1/028; H04R 3/00; H04R 7/12; H04R 9/025; H04R 9/06; H04R 2499/11; H04R 2499/15
(Continued)

(56) References Cited

U.S. PATENT DOCUMENTS 4,064,966 A 12/1977 Burton
9,762,999 B1 9/2017 Johnson et al.
(Continued)

FOREIGN PATENT DOCUMENTS

CN 2618396 Y 5/2004
CN 1819710 A 8/2006
(Continued)

*Primary Examiner* — William A Jerez Lora
(74) *Attorney, Agent, or Firm* — WOMBLE BOND DICKINSON (US) LLP

(57) ABSTRACT

Embodiments of this application provide a speaker module and a portable electronic device. The speaker module includes a first speaker module and a second speaker module. The first speaker module includes a first housing and a first speaker monomer accommodated in the first housing, and the first speaker monomer has a first diaphragm. The second speaker module includes a second housing and a second speaker monomer accommodated in the second housing, and the second speaker monomer has a second diaphragm. The first speaker module and the second speaker module are sequentially disposed in a vertical direction, and a vibration direction of the first diaphragm is opposite to a vibration direction of the second diaphragm, so that momentum variations (mv) Δ of the speaker module are offset against each other, thereby resolving a problem that a vibration feeling is strong when the speaker module works.

16 Claims, 4 Drawing Sheets

(51) Int. Cl.

| | |
|---|---|
| ***H04R 3/00*** | (2006.01) |
| ***H04R 7/12*** | (2006.01) |
| *H04R 9/02* | (2006.01) |
| *H04R 9/06* | (2006.01) |

(52) U.S. Cl.
CPC ............... *H04R 7/12* (2013.01); *H04R 9/025* (2013.01); *H04R 9/06* (2013.01); *H04R 2499/11* (2013.01); *H04R 2499/15* (2013.01)

(58) Field of Classification Search
USPC ................................. 381/334, 335, 342, 351
See application file for complete search history.

(56) References Cited

U.S. PATENT DOCUMENTS

| | | | | |
|---|---|---|---|---|
| 9,774,935 | B2 | 9/2017 | Matsumura et al. | |
| 10,250,994 | B2 * | 4/2019 | Griffiths | H04R 1/323 |
| 10,535,966 | B2 | 1/2020 | Tak et al. | |
| 2003/0003945 | A1 | 1/2003 | Saiki et al. | |
| 2007/0177742 | A1 * | 8/2007 | Edgren | H04M 1/035 381/89 |
| 2008/0317255 | A1 * | 12/2008 | Cozens | H04R 9/10 381/182 |
| 2009/0208026 | A1 | 8/2009 | Nichols et al. | |
| 2012/0099733 | A1 | 4/2012 | Wang et al. | |
| 2014/0328491 | A1 * | 11/2014 | Slotte | H04R 1/26 381/74 |
| 2016/0286313 | A1 | 9/2016 | Kofman et al. | |
| 2017/0055069 | A1 * | 2/2017 | Lee | H04R 1/2826 |

FOREIGN PATENT DOCUMENTS

| | | | |
|---|---|---|---|
| CN | 202395971 | U | 8/2012 |
| CN | 103781002 | A | 5/2014 |
| CN | 109936803 | A | 6/2019 |
| JP | H11178083 | A | 7/1999 |
| JP | H11205886 | A | 7/1999 |
| JP | 2001104881 | A | 4/2001 |
| JP | 2013183451 | A | 9/2013 |
| TW | M535921 | U | 1/2017 |
| WO | 2020011372 | A1 | 1/2020 |

* cited by examiner

SPEAKER MODULE AND PORTABLE ELECTRONIC DEVICE

CROSS-REFERENCE TO RELATED APPLICATIONS

This application is a national stage of International Application No. PCT/CN2020/128013, filed on Nov. 11, 2020, which claims priority to Chinese Patent Application No. 201911159240.5, filed on Nov. 22, 2019. Both of the aforementioned applications are hereby incorporated by reference in their entireties.

TECHNICAL FIELD

This application relates to the field of electronic technologies, and in particular, to a speaker module and a portable electronic device.

BACKGROUND

With advent of the mobile Internet era, electronic products are updated increasingly faster, and people have higher requirements for performance in various aspects of electronic products. One of the requirements is a high-quality music function.

In a related technology, a speaker module usually includes a housing and one speaker monomer accommodated in the housing. A reaction force generated when a diaphragm of the speaker monomer vibrates causes a strong vibration feeling of the speaker monomer. Therefore, the speaker monomer vibrates, and abnormal noise occurs on an electronic device with the speaker module, affecting user experience.

Therefore, currently, a speaker module and a portable electronic device are urgently required to resolve the foregoing problem.

SUMMARY

In view of the problem in the background, this application is intended to provide a speaker module and a portable electronic device, to resolve a problem that a vibration feeling is strong when the speaker module works.

According to a first aspect, this application provides a speaker module, including:

a first speaker module, where the first speaker module includes a first housing and a first speaker monomer accommodated in the first housing, and the first speaker monomer has a first diaphragm; and a second speaker module, where the second speaker module includes a second housing and a second speaker monomer accommodated in the second housing, and the second speaker monomer has a second diaphragm.

The first speaker module and the second speaker module are sequentially disposed in a vertical direction, and a vibration direction of the first diaphragm is opposite to a vibration direction of the second diaphragm, so that momentum variations (mv) Δ of the speaker module can be offset against each other, thereby resolving a problem that a vibration feeling is strong when the speaker module works.

In an embodiment, the first speaker monomer and the second speaker monomer are staggered in a horizontal direction, to facilitate assembly of the speaker module.

In an embodiment, a first mounting part and a second sounding part are disposed in the first housing, the first speaker monomer is disposed in the first mounting part, the first mounting part has a first opening, and the first diaphragm is opposite to the first opening;

a second mounting part and a first sounding part are disposed in the second housing, the second speaker monomer is disposed in the second mounting part, the second mounting part has a second opening, and the second diaphragm is opposite to the second opening; and the second opening, the first sounding part, and the second sounding part are sequentially connected, to increase a sounding area of the speaker module and further improve sound loudness.

In an embodiment, a cross-sectional area of the second sounding part is not less than a cross-sectional area of the first sounding part, so that a sound emitted by the second speaker monomer can be more smoothly emitted.

In an embodiment, the first mounting part and the second sounding part are disposed on a same side of the first housing, so that sound loudness of the speaker module is more conveniently improved.

In an embodiment, the first housing and the second housing are an integral structure, so that mounting operations for assembling the speaker module can be reduced.

In an embodiment, the first housing and the second housing are separated structures, the first speaker monomer and the first housing form a first rear cavity, and the second speaker monomer and the second housing form a second rear cavity, to facilitate assembly of the first speaker module and the second speaker module.

In an embodiment, the first rear cavity and the second rear cavity are connected, so that a structure of the speaker module can be more compact.

In an embodiment, structures of the first speaker monomer and the second speaker monomer are the same, so that it can be convenient for a circuit board to perform driving control over the first speaker monomer and the second speaker monomer.

According to a second aspect, this application provides a portable electronic device, including the foregoing speaker module and a circuit board electrically connected to the speaker module, to ensure that relatively small vibration excitation or even no vibration excitation occurs on the portable electronic device.

It can be learned that in the foregoing aspects, the first speaker monomer and the second speaker monomer are sequentially disposed in the vertical direction, and the vibration direction of the first diaphragm is opposite to the vibration direction of the second diaphragm, so that the momentum variations (mv) Δ of the speaker module are offset against each other, thereby resolving a problem that a vibration feeling is strong when the speaker module works.

It should be understood that the foregoing general description and the following detailed description are merely examples, and cannot limit this application.

REFERENCE NUMERALS

Figure 1:
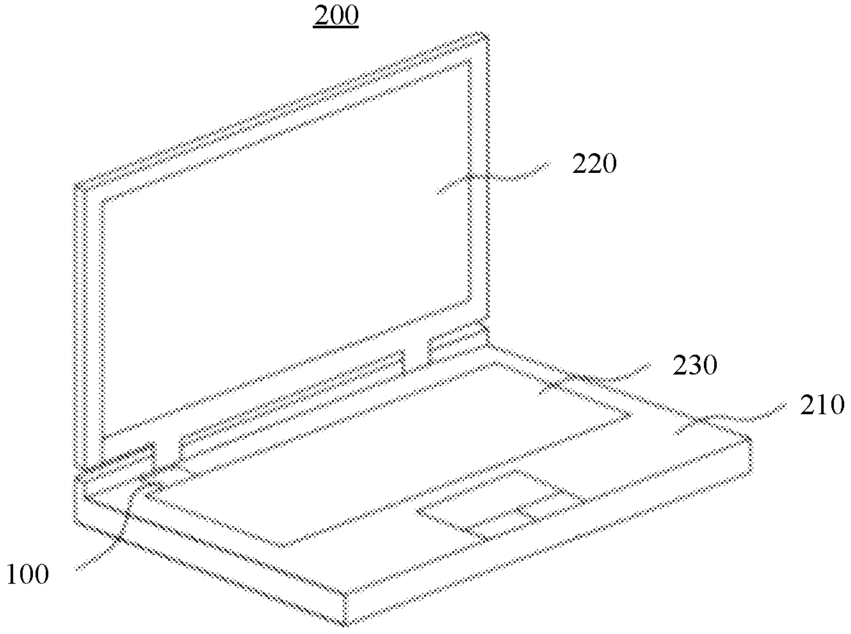
FIG. 1 is a schematic diagram of a structure of an electronic device according to an embodiment of this application.

X—Horizontal direction;
Y—Vertical direction;
F1—Vibration direction of a first diaphragm;
F2—Vibration direction of a second diaphragm;
100—Speaker module;
10—First speaker module;
11—First housing;
111—First mounting part;
111*a*—First opening;
112—Second sounding part;
112*a*—Step;
21—First speaker monomer;
21*a*—First rear cavity;
211—First diaphragm;
212—Voice coil;
213—Support;
214—Magnetic yoke;
215—Center magnet;
216—Side magnet;
217—Center magnetic plate;
218—Side magnetic plate;
219—Magnetic gap;
20—Second speaker module;
12—Second housing;
121—Second mounting part;
121*a*—Second opening;
122—First sounding part;
22—Second speaker monomer;
22*a*—Second rear cavity;
221—Second diaphragm;
200—Notebook computer;
210—Main body;
220—Screen;
230—Keyboard.

The accompanying drawings herein are incorporated into the specification and constitute a part of the specification, show embodiments conforming to this application, and are used together with the specification to explain a principle of this application.

DESCRIPTION OF EMBODIMENTS

To better understand the technical solutions of this application, the following describes embodiments of this application in detail with reference to the accompanying drawings.

It should be clear that described embodiments are merely some rather than all of embodiments of this application. All other embodiments obtained by a person of ordinary skill in the art based on embodiments of this application without creative efforts shall fall within the protection scope of this application.

The terms used in embodiments of this application are merely for the purpose of illustrating specific embodiments, and are not intended to limit this application. The terms "a" and "the" of singular forms used in embodiments and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that, position words such as "above", "below", "left", and "right" described in embodiments of this application are described from angles shown in the accompanying drawings, and should not be construed as a limitation on embodiments of this application. Moreover, in the context, it also should be understood that, when it is mentioned that one element is connected "above" or "below" another element, it cannot only be directly connected "above" or "below" the another element, but also be indirectly connected "above" or "below" the another element by using an intermediate element.

With development of portable electronic device technologies, people impose an increasingly high requirement on a sound effect of external playback of a portable electronic device (such as a notebook computer). To improve a low frequency response of the notebook computer, an amplitude of a micro speaker of the notebook computer is designed to be increasingly large. However, with application of large amplitude of the micro speaker, vibration of a voice coil and a diaphragm of the micro speaker excites keyboard vibration, affecting user experience of using a keyboard. In addition, noise affecting sound quality of play is generated. In a related technology, vibration of the keyboard is usually reduced by reducing amplitude of the voice coil of the speaker, but low-frequency loudness is also reduced, and a sound effect is sacrificed.

As shown in FIG. 1, to resolve the foregoing technical problem, embodiments of this application provide a portable electronic device. In some embodiments, the electronic device may be a notebook computer 200, or certainly may be another electronic device such as a tablet computer or a mobile phone. This is not exhausted herein in this application.

In an embodiment, the notebook computer 200 includes a main body 210, a screen 220, and a keyboard 230 disposed on the main body 210. A speaker module 100 is disposed inside the main body 210. A circuit board (not shown in the figure) is disposed in the main body 210, and the speaker module 100 is electrically connected to the circuit board, so that the circuit board transmits an electrical signal to the speaker module 100, to emit a sound by using the speaker module 100.

In some embodiments, the speaker module 100 may be disposed at any position on a side of the keyboard 230 on the main body 210, for example, may be disposed at a part (as indicated by a dashed line) above the keyboard 230 shown in FIG. 1. In a related technology, a speaker module usually includes a housing and one speaker monomer accommodated in the housing. A reaction force generated when a diaphragm of the speaker monomer vibrates causes a strong vibration feeling of the speaker monomer. Therefore, the speaker monomer vibrates, and abnormal noise occurs on an electronic device with the speaker module, affecting user experience. The speaker module 100 provided in embodiments of this application can well resolve the foregoing technical problem.

Figure 2:
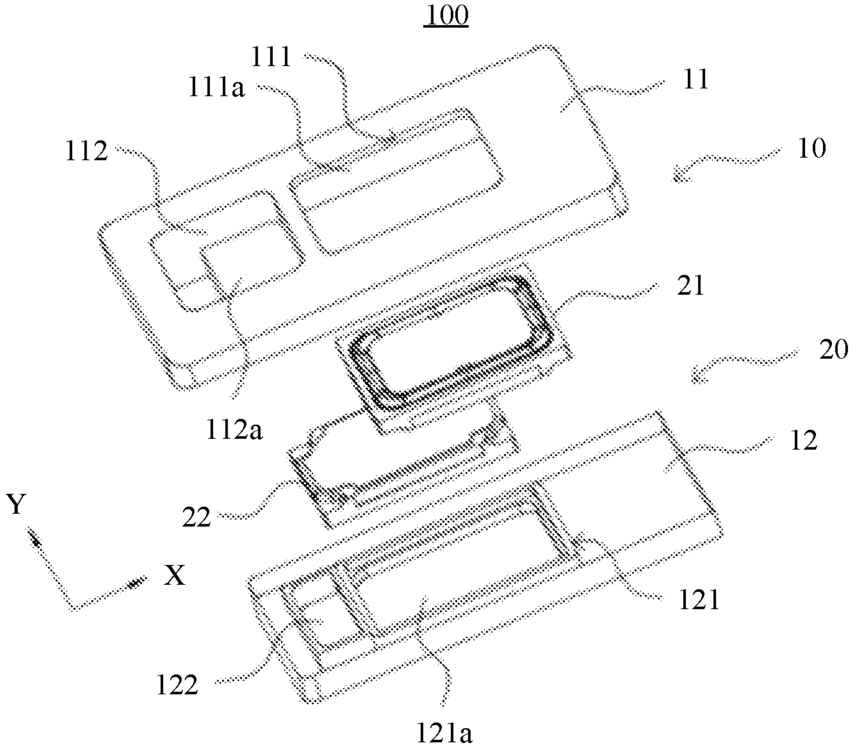
FIG. 2 is a schematic exploded view of a speaker module according to an embodiment of this application.

As shown in FIG. 2, an embodiment of this application provides a speaker module 100. The speaker module 100 includes a first speaker monomer 21 and a second speaker monomer 22 (refer to FIG. 2). When the first speaker monomer 21 and the second speaker monomer 22 work, vibration directions of diaphragms are opposite, so that momentum variations (mv) Δ of the speaker module 100 can be offset against each other, thereby ensuring that relatively small vibration excitation or even no vibration excitation occurs on the notebook computer 200. In this way, when the speaker module 100 plays a sound and a user uses the keyboard 230, vibration impact on the main body 210 and the keyboard 230 that is caused by the speaker module 100 are greatly reduced, so that user experience can be improved, and a sound effect and sound quality of play of the notebook computer 200 can be further improved.

The following describes the speaker module 100.

Embodiment 1

Figure 3:
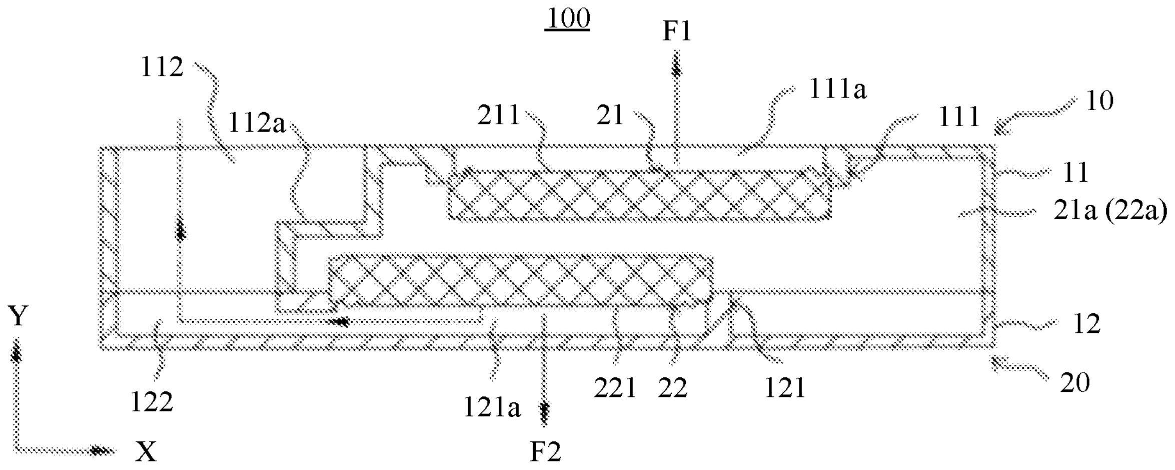
FIG. 3 is a schematic sectional view of the speaker module according to an embodiment of this application.

FIG. 2 is a schematic exploded view of a speaker module 100 according to an embodiment of this application. FIG. 3 is a schematic sectional view of the speaker module 100 according to Embodiment 1 of this application. Referring to FIG. 2 and FIG. 3, the speaker module 100 includes a first speaker module 10 and a second speaker module 20. The first speaker module 10 includes a first housing 11 and a first speaker monomer 21 accommodated in the first housing 11, and the first speaker monomer 21 has a first diaphragm 211. The second speaker module 20 includes a second housing 12 and a second speaker monomer 22 accommodated in the second housing 12, and the second speaker monomer 22 has a second diaphragm 221.

The first speaker module 10 and the second speaker module 20 are sequentially disposed in a vertical direction Y. For example, the first speaker module 10 may be disposed above the second speaker module 20. It may be understood that the first speaker module 10 may be disposed exactly above the second speaker module 20 (for example, in FIG. 4), or the first speaker module 10 may be disposed obliquely above the second speaker module 20 (for example, in FIG. 3, FIG. 5, and FIG. 6).

In an embodiment, the first speaker module 10 and the second speaker module 20 are disposed in opposite directions. Specifically, the first diaphragm 211 and the second diaphragm 221 may be disposed in opposite directions. In other words, a vibration direction F1 of the first diaphragm 211 is opposite to a vibration direction F2 of the second diaphragm 221. In this way, momentum variations (mv) Δ of the speaker module 100 can be offset against each other, so that it can be ensured that relatively small vibration excitation or even no vibration excitation occurs on a portable electronic device with the speaker module 100.

Figure 7:
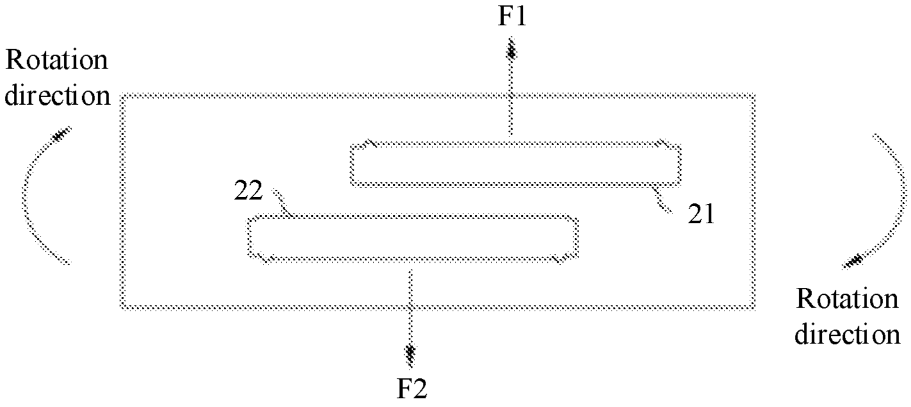
FIG. 7 is a schematic view of force analysis on the speaker module according to some embodiments of this application.

FIG. 7 is a schematic view of force analysis on the speaker module 100 according to Embodiment 1, Embodiment 3, and Embodiment 4 of this application. When the first speaker module 10 is disposed obliquely above the second speaker module 20, forces of the speaker module 100 in the vibration directions of the diaphragms are offset against each other, and only stress in a rotation direction remains. It is verified that vibration excitation of the portable electronic device with the speaker module 100 is greatly reduced.

In some embodiments, a first mounting part 111 is disposed in the first housing 11, the first speaker monomer 21 is disposed in the first mounting part 111, a second mounting part 121 is disposed in the second housing 12, and the second speaker monomer 22 is disposed in the second mounting part 121. For example, mounting step surfaces are separately disposed for the first mounting part 111 and the second mounting part 121. The first diaphragm 211 may be fastened to a mounting step surface of the first mounting part 111 through glue dispensing, and the second diaphragm 221 may be fastened to a mounting step surface of the second mounting part 121 through glue dispensing. In this way, mounting and fastening of the first speaker monomer 21 and the second speaker monomer 22 are implemented.

In some embodiments, the first mounting part 111 has a first opening 111*a*, and the first diaphragm 211 is opposite to the first opening 111*a*. In this way, the first diaphragm 211 can emit a sound by using the first opening 111*a*, for example, a direction of the sound emitted by the first diaphragm 211 is the same as the vibration direction F1 of the first diaphragm 211.

In some embodiments, the second mounting part 121 has a second opening 121*a*, and the second diaphragm 221 is opposite to the second opening 121*a*. In this way, the second diaphragm 221 can emit a sound by using the second opening 121*a*, for example, a direction of the sound emitted by the second diaphragm 221 is the same as the vibration direction F2 of the second diaphragm 221. Because of a manner of disposing the second housing 12, the direction of the sound emitted by the second diaphragm 221 can change. For a sound transmission path of the second diaphragm 221, refer to a dashed line part in FIG. 3.

In some embodiments, a second sounding part 112 is further disposed in the first housing 11, a first sounding part 122 is further disposed in the second housing 12, and the second opening 121*a*, the first sounding part 122, and the second sounding part 112 are sequentially connected. In this way, the sound emitted by the second speaker monomer 22 can be emitted by using the second sounding part 112, so that a sounding area of the speaker module 100 is increased, and sound loudness is further improved. Therefore, according to the speaker module 100 provided in this embodiment, sound loudness of two speaker monomers (namely, the first speaker monomer 21 and the second speaker monomer 22) can be achieved, and it can be further ensured that relatively small vibration excitation or even no vibration excitation occurs on the portable electronic device with the speaker module 100.

Figure 4:
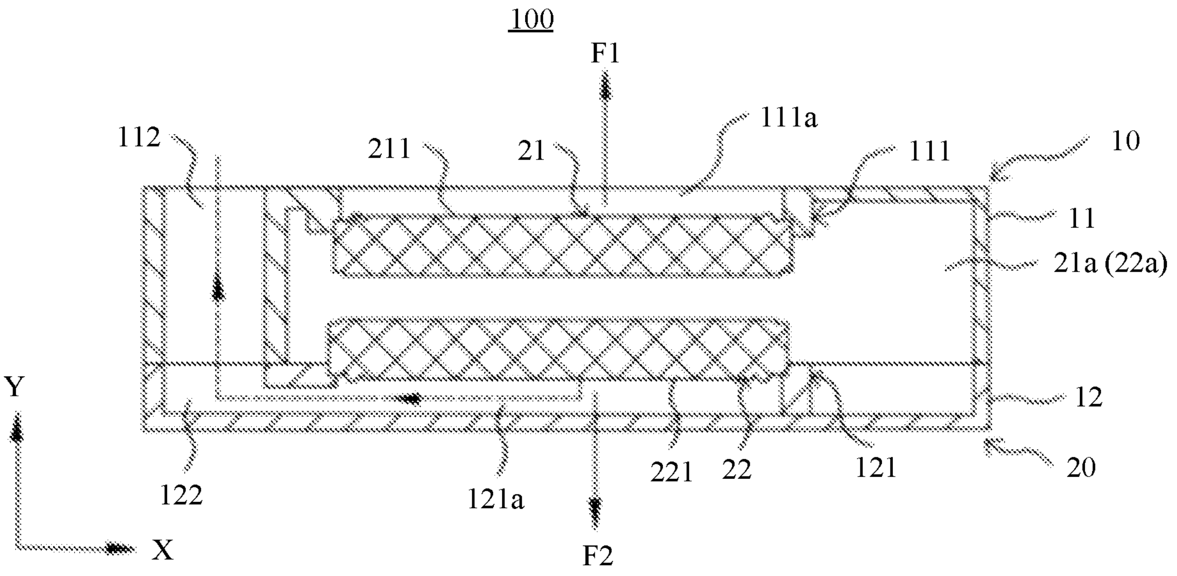
FIG. 4 is a schematic sectional view of a speaker module according to an embodiment of this application.
Figure 5:
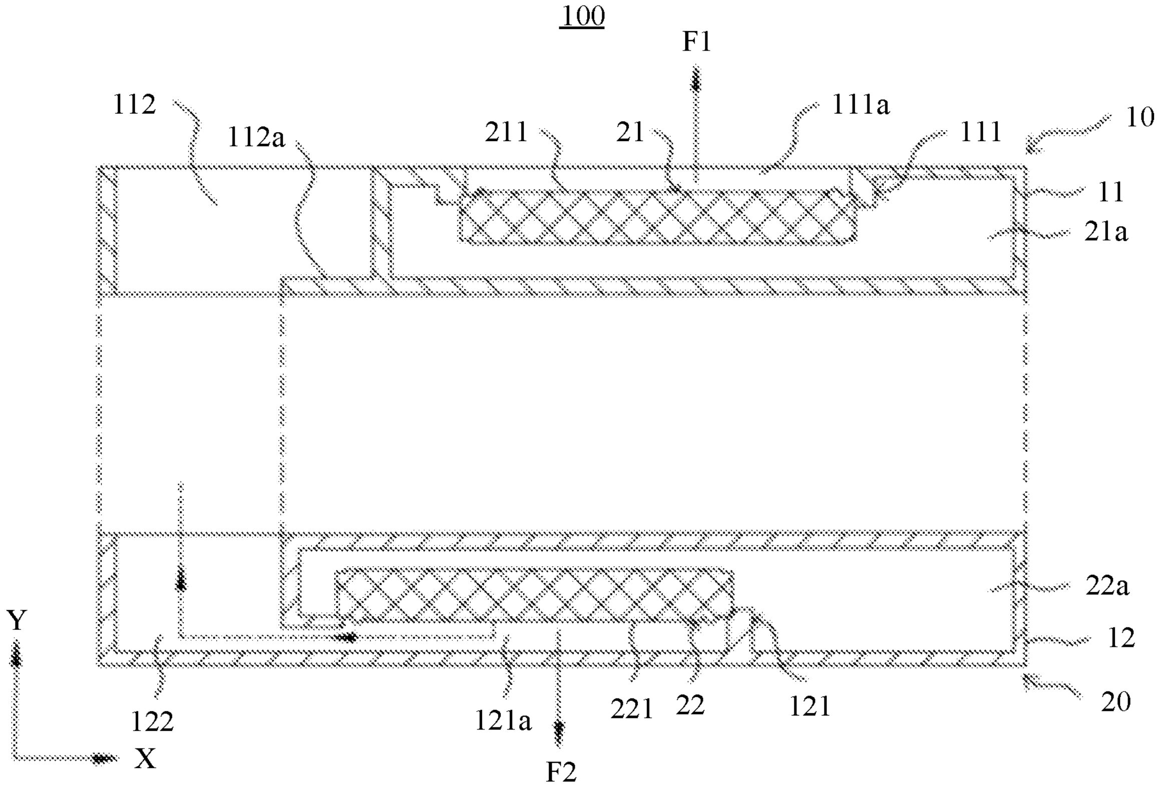
FIG. 5 is a schematic sectional view of a speaker module according to an embodiment of this application.
Figure 6:
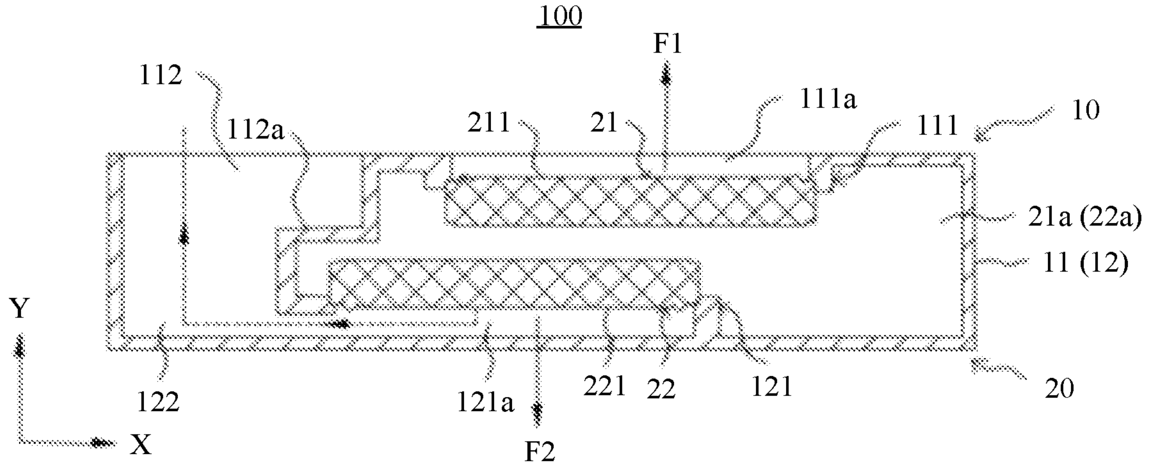
FIG. 6 is a schematic sectional view of a speaker module according to an embodiment of this application.

In some embodiments, a cross-sectional area of the second sounding part 112 is not less than a cross-sectional area of the first sounding part 122, so that the sound emitted by the second speaker monomer 22 can be more smoothly emitted. For example, as shown in FIG. 3, FIG. 5, and FIG. 6, the cross-sectional area of the second sounding part 112 is greater than the cross-sectional area of the first sounding part 122, and as shown in FIG. 4, the cross-sectional area of the second sounding part 112 is equal to the cross-sectional area of the first sounding part 122.

It should be noted that when the cross-sectional area of the second sounding part 112 is greater than the cross-sectional area of the first sounding part 122, the second sounding part 112 has a step 112*a* formed through an inward depression in a surface of the first housing 11, so that the cross-sectional area of the second sounding part 112 increases.

In some embodiments, the first mounting part 111 and the second sounding part 112 are disposed on a same side of the first housing 11. In this way, it can be ensured that the sound emitted by the second speaker monomer 22 and a sound emitted by the first speaker monomer 21 are in a same direction, so that sound loudness of the speaker module 100 can be more conveniently improved.

It may be understood that the first mounting part 111 and the second sounding part 112 may be alternatively disposed on different sides of the first housing 11. For example, the first speaker monomer 21 may emit a sound generated through excitation of a first electrical signal, and the second speaker monomer 22 may emit a sound generated through excitation of a second electrical signal. Therefore, the speaker module 100 can emit different sounds, but it can still be ensured that relatively small vibration excitation or even no vibration excitation occurs on the portable electronic device with the speaker module 100. The first electrical signal and the second electrical signal may be driven by different circuit boards, or may be driven by different drive modules of a same circuit board.

In some embodiments, the first housing 11 and the second housing 12 are separated structures. During assembly, the first speaker monomer 21 and the second speaker monomer 22 may be respectively fastened to the first housing 11 and the second housing 12, to respectively form the first speaker module 10 and the second speaker module 20. Then the first housing 11 and the second housing 12 are snap-fitted to form the speaker module 100. In this embodiment, the first speaker monomer 21 and the first housing 11 form a first rear cavity 21*a*, the second speaker monomer 22 and the second housing 12 form a second rear cavity 22*a*, and the first rear cavity 21*a* and the second rear cavity 22*a* are connected, in other words, a rear cavity is shared, so that a structure of the speaker module 100 can be more compact.

In some embodiments, structures of the first speaker monomer 21 and the second speaker monomer 22 are the same, so that it can be convenient for a circuit board to perform driving control over the first speaker monomer 21 and the second speaker monomer 22. Certainly, structures of the first speaker monomer 21 and the second speaker monomer 22 may be alternatively different. For example, one of the first speaker monomer 21 and the second speaker monomer 22 may be a moving coil speaker, and the other may be a moving coil speaker, a capacitive speaker, a piezoelectric speaker, or another type of speaker.

It may be understood that the structures of the first speaker monomer 21 and the second speaker monomer 22 may be the same or different, provided that the vibration directions of the diaphragms of the first speaker monomer 21 and the second speaker monomer 22 are opposite.

In an embodiment, the first speaker monomer 21 may be a moving coil speaker having the first diaphragm 211, the second speaker monomer 22 may also be a moving coil speaker having the second diaphragm 221, and the structures and sizes of the first speaker monomer 21 and the second speaker monomer 22 are the same, to facilitate driving control of the circuit board. The first speaker monomer 21 and the second speaker monomer 22 respectively include voice coils driving the first diaphragm 211 and the second diaphragm 221 to vibrate. In a working state, the diaphragm vibrates to emit a sound and push gas to be compressed to generate sound waves.

When both the first speaker monomer 21 and the second speaker monomer 22 are moving coil speakers, in some embodiments, the first speaker monomer 21 and the second speaker monomer 22 are staggered in a horizontal direction X, so that repulsion between the first speaker monomer 21 and the second speaker monomer 22 can be greatly reduced (because the moving coil speaker includes a magnet and repulsion between the first speaker monomer 21 and the second speaker monomer 22 is the largest when the first speaker monomer 21 and the second speaker monomer 22 face each other), thereby facilitating assembly of the speaker module 100.

The following uses the first speaker monomer 21 as an example to describe a specific structure of the first speaker monomer 21.

Figure 8:
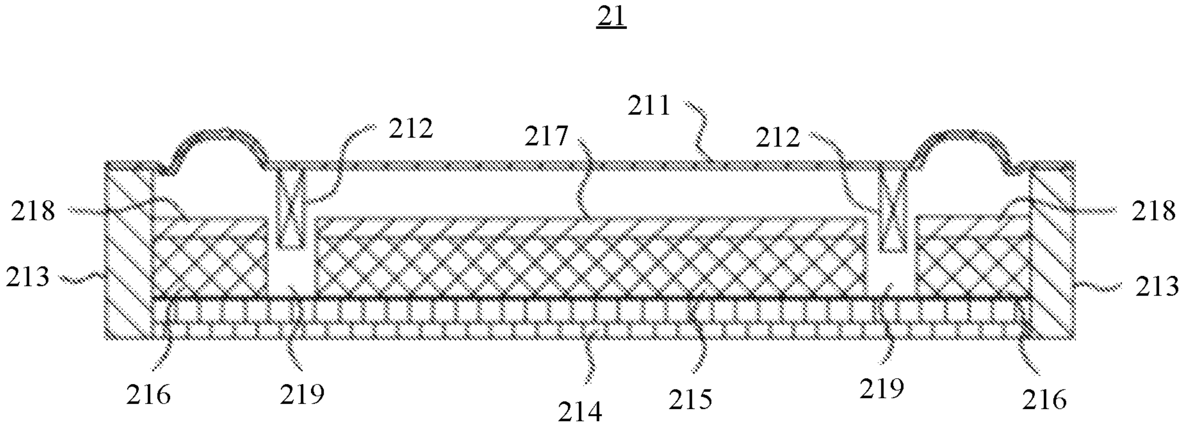
FIG. 8 is a schematic sectional view of a first speaker monomer in a speaker module according to an embodiment of this application.

As shown in FIG. 8, the first speaker monomer 21 includes a vibration component and a magnetic circuit component, the vibration component and the magnetic circuit component are fastened by using a support 213, and the magnetic circuit component is configured to form a permanent magnetic field. The vibration component includes the first diaphragm 211 and a voice coil 212. The first diaphragm 211 may be a bent diaphragm or a planar diaphragm. In this embodiment, the first diaphragm 211 is described by using the bent diaphragm as an example.

The first diaphragm 211 is hung above the magnetic circuit component. For example, an edge of the first diaphragm 211 is directly or indirectly fastened above the magnetic circuit system. Two wire ends of the voice coil 212 are connected to form a closed loop. The closed loop is formed, so that the voice coil 212 can produce an induced current when being excited by an excitation coil (not shown in the figure, where the circuit board is electrically connected to the excitation coil).

One end of the voice coil 212 is connected to the first diaphragm 211, and the other end of the voice coil 212 is inserted into the permanent magnetic field formed by the magnetic circuit system. According to Faraday's law of induction, the closed voice coil 212 produces an induced current, and the voice coil 212 to which the current is applied vibrates under the action of an ampere force in the permanent magnetic field. The vibration of the voice coil 212 drives the first diaphragm 211 to vibrate, to emit a sound.

The magnetic circuit system includes a magnetic yoke 214 and a center magnet and a side magnet 216 that are disposed on the magnetic yoke 214, and the side magnet 216 is disposed around the center magnet 215. A permanent magnetic field is formed between the center magnet 215 and the side magnet 216, and the side magnet 216 is an annular magnet.

For example, the magnetic yoke 214 may be a sheet-like structure whose cross-section is a rectangle, the center magnet 215 may also be a sheet-like structure whose cross-section is a rectangle, and the side magnet 216 may be an annular structure whose cross-section is a rectangle. The center magnet 215 and the side magnet 216 are axially magnetized, and the center magnet 215 and the side magnet 216 are fastened to the magnetic yoke 214.

The magnetic yoke 214 has a magnetic conduction function, and the magnetic yoke 214 enables the magnetic circuit component to form a closed magnetic circuit and can converge magnetic inductance lines of the center magnet 215 and the side magnet 216, to improve magnetic induction intensity of the permanent magnetic field. The permanent magnetic field is formed in a magnetic gap 219 between the center magnet 215 and the side magnet 216. The center magnet 215 and the side magnet 216 are disposed, so that magnetic induction intensity of the permanent magnetic field is higher, and therefore vibration sensitivity of the speaker monomer is higher.

In addition, the annular magnet has a larger area, so that values of B and L (B is magnetic induction intensity of the permanent magnetic field, and L is an effective length of the voice coil 212) are larger, and an induced current is larger, so that vibration sensitivity of the speaker monomer is higher. Certainly, the side magnet 216 may be alternatively formed through enclosure of a plurality of bar magnets or arc-shaped magnets. This structure can also form a permanent magnetic field together with the center magnet 215.

The first speaker monomer 21 further includes a center magnetic plate 217 and a side magnetic plate 218. The center magnetic plate 217 is disposed above the center magnet 215, and the side magnetic plate 218 is disposed above the side magnet 216. The permanent magnetic field is formed between the center magnetic plate 217 and the side magnetic plate 218. The side magnetic plate 218 is of an annular structure. The center magnetic plate 217 and the side magnetic plate 218 can have a function of converging magnetic inductance lines, so that magnetic induction intensity of the permanent magnetic field is higher. In this way, vibration sensitivity of the speaker monomer can be improved.

Embodiment 2

FIG. 4 is a schematic sectional view of a speaker module 100 according to an embodiment of this application. The speaker module 100 provided in Embodiment 2 differs from that in Embodiment 1 in that the first speaker module 10 may be disposed exactly above the second speaker module 20, and the cross-sectional area of the second sounding part 112 is equal to the cross-sectional area of the first sounding part 122. The differences are clearly stated in the solution describing Embodiment 1, and details are not described herein again.

Embodiment 3

FIG. 5 is a schematic sectional view of a speaker module 100 according to an embodiment of this application. The speaker module 100 provided in Embodiment 3 differs from that in Embodiment 1 in that the first rear cavity 21*a* and the second rear cavity 22*a* are not connected. In other words, the speaker module 100 provided in Embodiment 1 is actually one speaker, but the speaker module 100 provided in Embodiment 3 is actually two speakers.

It may be understood that whether the speaker module 100 has one speaker or two speakers depends on whether housings are independently disposed. For example, in the speaker module 100 provided in Embodiment 1, the first housing 11 and the second housing 12 are fastened to form a whole, namely, one speaker. In the speaker module 100 provided in Embodiment 3, the first housing 11 and the second housing 12 each are a whole, but two speakers are integrated together through fastening.

Embodiment 4

FIG. 6 is a schematic sectional view of a speaker module 100 according to an embodiment of this application. The speaker module 100 provided in Embodiment 4 differs from that in Embodiment 1 in that the first housing 11 and the second housing 12 are an integral structure. For example, the first housing 11 and the second housing 12 may form a whole through injection molding. In this way, mounting operations for assembling the speaker module 100 can be reduced, in other words, the first housing 11 and the second housing 12 no longer need to be fastened.

In conclusion, according to the speaker module 100 provided in this application, the first speaker monomer 21 and the second speaker monomer 22 are sequentially disposed in the vertical direction Y, and the vibration direction of the first diaphragm 211 is opposite to the vibration direction of the second diaphragm 221, so that the momentum variations (my) Δ of the speaker module 100 are offset against each other, thereby ensuring that relatively small vibration excitation or even no vibration excitation occurs on the portable electronic device with the speaker module 100.

The foregoing descriptions are merely preferred embodiments of this application, but are not intended to limit this application. For a person skilled in the art, various changes and variations may be made in this application. Any modification, equivalent replacement, or improvement made without departing from the spirit and principle of this application should fall within the protection scope of this application.

What is claimed is:

1. A speaker module, comprising:

a first speaker module comprising a first housing and a first speaker monomer accommodated in the first housing, wherein the first speaker monomer includes a first diaphragm;

a second speaker module comprising a second housing and a second speaker monomer accommodated in the second housing, wherein the second speaker monomer includes a second diaphragm, wherein the first speaker module and the second speaker module are sequentially disposed in a vertical direction (Y), and a vibration direction of the first diaphragm is opposite to a vibration direction of the second diaphragm so that momentum variations of the first speaker module and the second speaker module offset against each other;

a first mounting part having a first opening and a second sounding part disposed in the first housing, wherein the first speaker monomer is disposed in the first mounting part, and the first diaphragm is opposite to the first opening; and a second mounting part having a second opening and a first sounding part disposed in the second housing, wherein the second speaker monomer is disposed in the second mounting part, and the second diaphragm is opposite to the second opening, wherein the second opening, the first sounding part, and the second sounding part are sequentially connected.

2. The speaker module according to claim 1, wherein the first speaker monomer and the second speaker monomer are staggered in a horizontal direction (X).

3. The speaker module according to claim 1, wherein a cross-sectional area of the second sounding part is not less than a cross-sectional area of the first sounding part.

4. The speaker module according to claim 1, wherein the first mounting part and the second sounding part are disposed on a same side of the first housing.

5. The speaker module according to claim 1, wherein the first housing and the second housing are an integral structure.

6. The speaker module according to claim 1, wherein the first housing and the second housing are separated structures, the first speaker monomer and the first housing form a first rear cavity, and the second speaker monomer and the second housing form a second rear cavity.

7. The speaker module according to claim 6, wherein the first rear cavity and the second rear cavity are connected.

8. The speaker module according to claim 1, wherein structures of the first speaker monomer and the second speaker monomer are the same.

9. A portable electronic device, comprising a speaker module-and a circuit board electrically connected to the speaker module;

wherein the speaker module comprises:

a first speaker module comprising a first housing and a first speaker monomer accommodated in the first housing, wherein the first speaker monomer includes a first diaphragm;

a second speaker module comprising a second housing and a second speaker monomer accommodated in the second housing, wherein the second speaker monomer includes a second diaphragm, wherein the first speaker module and the second speaker module are sequentially disposed in a vertical direction (Y), and a vibration direction of the first diaphragm is opposite to a vibration direction of the second diaphragm so that momentum variations of the first speaker module and the second speaker module offset against each other;

a first mounting part having a first opening and a second sounding part disposed in the first housing, wherein the first speaker monomer is disposed in the first mounting part, and the first diaphragm is opposite to the first opening; and a second mounting part having a second opening and a first sounding part disposed in the second housing, wherein the second speaker monomer is disposed in the second mounting part. and the second diaphragm is opposite to the second opening, wherein the second opening, the first sounding part, and the second sounding part are sequentially connected.

10. The portable electronic device according to claim 9, wherein the first speaker monomer and the second speaker monomer are staggered in a horizontal direction (X).

11. The portable electronic device according to claim 9, wherein a cross-sectional area of the second sounding part is not less than a cross-sectional area of the first sounding part.

12. The portable electronic device according to claim 9, wherein the first mounting part and the second sounding part are disposed on a same side of the first housing.

13. The portable electronic device according to claim 9, wherein the first housing and the second housing are an integral structure.

14. The portable electronic device according to claim 9, wherein the first housing and the second housing are separated structures, the first speaker monomer and the first housing form a first rear cavity, and the second speaker monomer and the second housing form a second rear cavity.

15. The portable electronic device according to claim 14, wherein the first rear cavity and the second rear cavity are connected.

16. The portable electronic device according to claim 9, wherein structures of the first speaker monomer and the second speaker monomer are the same.

* * * * *